(12) United States Patent
Elnajjar

(10) Patent No.: US 9,277,486 B2
(45) Date of Patent: Mar. 1, 2016

(54) MANAGING WIRELESS COMMUNICATION SETTINGS IN A PLURALITY OF VEHICLES

(71) Applicant: General Motors LLC, Detroit, MI (US)

(72) Inventor: Hassan Elnajjar, Dearborn, MI (US)

(73) Assignee: General Motors LLC, Detroit, MI (US)

( * ) Notice: Subject to any disclaimer, the term of this patent is extended or adjusted under 35 U.S.C. 154(b) by 128 days.

(21) Appl. No.: 14/253,380

(22) Filed: Apr. 15, 2014

(65) Prior Publication Data

US 2015/0296441 A1    Oct. 15, 2015

(51) Int. Cl.
*H04W 4/00* (2009.01)
*H04W 48/10* (2009.01)

(52) U.S. Cl.
CPC .............. *H04W 48/10* (2013.01); *H04W 4/008* (2013.01)

(58) Field of Classification Search
None
See application file for complete search history.

(56) References Cited

U.S. PATENT DOCUMENTS

| 7,506,309 | B2* | 3/2009 | Schaefer | G07C 5/008 701/31.4 |
| 8,928,495 | B2* | 1/2015 | Hassib | G06F 17/00 340/540 |
| 9,008,906 | B2* | 4/2015 | Ricci | G06F 17/00 180/232 |
| 2014/0220966 | A1* | 8/2014 | Muetzel | H04W 4/046 455/426.1 |
| 2015/0050906 | A1* | 2/2015 | Yuasa | H04W 4/22 455/404.2 |

* cited by examiner

*Primary Examiner* — Frank Duong
(74) *Attorney, Agent, or Firm* — Christopher DeVries; Reising Ethington P.C.

(57) ABSTRACT

A method of managing short-range wireless communications settings applied at a vehicle includes detecting a plurality of short-range wireless communications settings used by an existing vehicle; storing the plurality of short-range wireless communications settings with a subscriber identity; detecting that a person associated with the subscriber identity has begun using a new vehicle; uploading the plurality of short-range wireless communications settings from the existing vehicle to the new vehicle; and applying the plurality of short-range wireless communications settings associated with the subscriber identity to the new vehicle.

16 Claims, 2 Drawing Sheets

MANAGING WIRELESS COMMUNICATION SETTINGS IN A PLURALITY OF VEHICLES

TECHNICAL FIELD

The present invention relates to wireless communications in a vehicle and, more particularly, to wireless communication settings applied to a plurality of vehicles.

BACKGROUND

Modern vehicles frequently provide wireless connections with wireless devices carried by vehicle occupants. When a vehicle occupant enters a vehicle with a wireless device, the vehicle can establish a short-range wireless communication link with the device. The short-range wireless communication link can allow the wireless device to communicate with and/or through the vehicle. These short-range wireless links are often created by authenticating the vehicle providing the wireless link, the wireless device accessing it, or both. In one example, the vehicle occupant can identify the vehicle broadcasting a short-range wireless link using the wireless device and select the vehicle identity. Also, the wireless device can be authenticated to the vehicle when the wireless device provides a password to gain access to the wireless link or network provided by the vehicle.

After these types of authentication occur, the vehicle occupant may not have to re-authenticate the wireless device with the vehicle again as the vehicle and wireless device can recognize each other when they come within a particular range. However, vehicle occupants may not exclusively use one vehicle. In that case, each new vehicle the vehicle occupant enters may ask to authenticate each wireless device in order to establish access to the short-range wireless link. Thus, it would be helpful for vehicle occupants to be able to enter new vehicles without re-authenticating wireless devices yet also maintain wireless security at the vehicle.

SUMMARY

According to an embodiment of the disclosure, there is provided a method of managing short-range wireless communications settings applied at a vehicle. The method includes detecting a plurality of short-range wireless communications settings used by an existing vehicle; storing the plurality of short-range wireless communications settings with a subscriber identity; detecting that a person associated with the subscriber identity has begun using a new vehicle; uploading the plurality of short-range wireless communications settings from the existing vehicle to the new vehicle; and applying the plurality of short-range wireless communications settings associated with the subscriber identity to the new vehicle.

According to another embodiment of the disclosure, there is provided a method of managing short-range wireless communications settings applied at a vehicle. The method includes storing the identity of a wireless device with a subscriber identity; linking a wireless identifier broadcast by an existing vehicle with the subscriber identity; detecting the presence of the wireless device stored with the subscriber identity at a new vehicle; transmitting the wireless identifier broadcast by the existing vehicle to the new vehicle; and broadcasting the wireless identifier at the new vehicle.

According to yet another embodiment of the disclosure, there is provided a method of managing short-range wireless communications settings applied at a vehicle. The method includes broadcasting a service set identification (SSID) at a Wi-Fi hotspot provided by an existing vehicle; identifying at the existing vehicle a wireless device that has used the Wi-Fi hotspot; storing the identity of the wireless device that has used the Wi-Fi hotspot and the broadcast SSID under a subscriber identity; detecting the identity of the wireless device at a new vehicle; searching a central database of subscriber identities for the identity of the detected wireless device; when the identity of the wireless device is located in the central database, accessing the SSID stored with the identity of the wireless device under the subscriber identity; wirelessly downloading the accessed SSID at the new vehicle; and broadcasting the SSID at a Wi-Fi hotspot provided by the new vehicle.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

Figure 1:
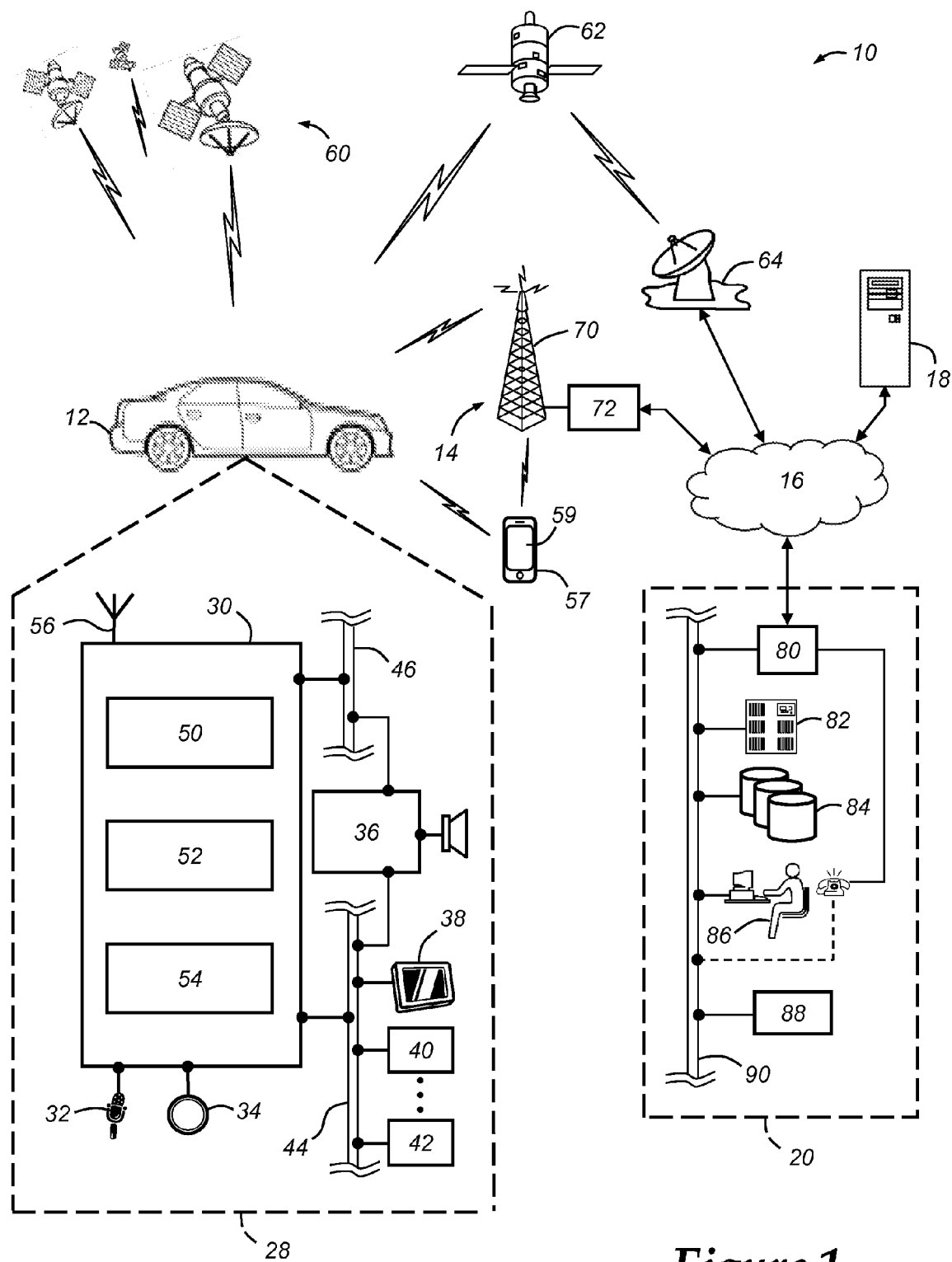
FIG. 1 is a block diagram depicting an embodiment of a communications system that is capable of utilizing the method disclosed herein.

The system and method described below manages short-range wireless communications settings applied at different vehicles. A vehicle owner, lessee, or occupant can use one or more wireless devices in and around a vehicle by establishing short-range wireless communication links with the vehicle. Through various short-range wireless communications protocols, the wireless devices can communicate with or through the vehicle. For example, the vehicle can provide a Wi-Fi hotspot through which one or more wireless devices can access the Internet. Or in another example, the vehicle occupants can pair the wireless device(s) with the vehicle using a Bluetooth wireless connection. Broadly speaking, the short-range wireless communication links can be established using any of the IEEE 802.11 standard wireless protocols. As part of establishing the short-range wireless link, the vehicle, the wireless device, or both can ask for some type of authentication. As noted above, once the wireless device and the vehicle have been previously linked they likely will not ask each other for authentication. However, the vehicle occupant may carry previously-linked wireless devices into different vehicles, which may involve performing the authentication steps anew. In one example of these authentication steps, a Wi-Fi network hosted by the vehicle could require a password from a wireless device to gain access. However, when the vehicle detects that it has previously established a short-range wireless link with that device, the vehicle may not require the password.

It is possible to transport the wireless devices to new or different vehicles and establish short-range wireless links with the new/different vehicles without re authenticating the wireless devices. One or more wireless devices can be associated or otherwise stored with a subscriber account. The subscriber account can belong to a vehicle owner, lessee, or occupant and be stored at the vehicle or a central facility. Under the subscriber account, the identity of one or more wireless devices can be saved along with one or more vehicle identities, identifiers broadcast by the vehicles via short-range wireless signals, and a password associated with each broadcast identifier. One example of the broadcast identifiers can be a Wi-Fi service set identification (SSID) also referred to as a network name. When the person to whom the subscriber account belongs begins using a new vehicle, the information in the subscriber account can be wirelessly transmitted to the new vehicle such that the new vehicle can begin broadcasting one or more broadcast identifiers stored with the subscriber account and recognizing wireless devices and passwords stored in the subscriber account. That way, the new vehicle can be configured to appear like the existing vehicle to wireless devices accustomed to what has been broadcast by the existing vehicle. The broadcast identifier originally broadcast by the existing vehicle and stored with the subscriber account can then be broadcast at the new vehicle. Similarly, the password accepted by the existing vehicle and stored with the subscriber account can be accepted at the new vehicle. The wireless devices identified in the subscriber account can be moved to the new vehicle, recognize a familiar broadcast identifier, and provide a password the new vehicle can accept all without a user manually authenticating the wireless devices with the new vehicle.

Communications System—

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly via a short-range wireless link according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One of the networked devices that can communicate with the vehicle telematics unit 30 is a wireless device, such as a smart phone 57. The smart phone 57 can include computer processing capability, a transceiver capable of communicating using a short-range wireless protocol, and a visual smart phone display 59. In some implementations, the smart phone display 59 also includes a touch-screen graphical user interface and/or a GPS module capable of receiving GPS satellite signals and generating GPS coordinates based on those signals. Examples of the smart phone 57 include the iPhone™ manufactured by Apple, Inc. and the Droid™ manufactured by Motorola, Inc. as well as others. These and other similar devices may be used or considered as a type of wireless device for the purposes of the method and system described herein. White the smart phone 57 is described as a wireless device used with the method/system, it should be appreciated that other similar and/or simpler wireless devices capable of short-range wireless communication can be successfully substituted for the smart phone 57 to carry out the method/system described herein. An iPad™ manufactured by Apple, Inc. is an example of such a wireless device that may lack cellular communication capability of the smart phone 57 yet be able to communicate with the Wi-Fi network. Laptop computers are another example of such a wireless device for purposes of explanation.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide unidirectional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 116, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
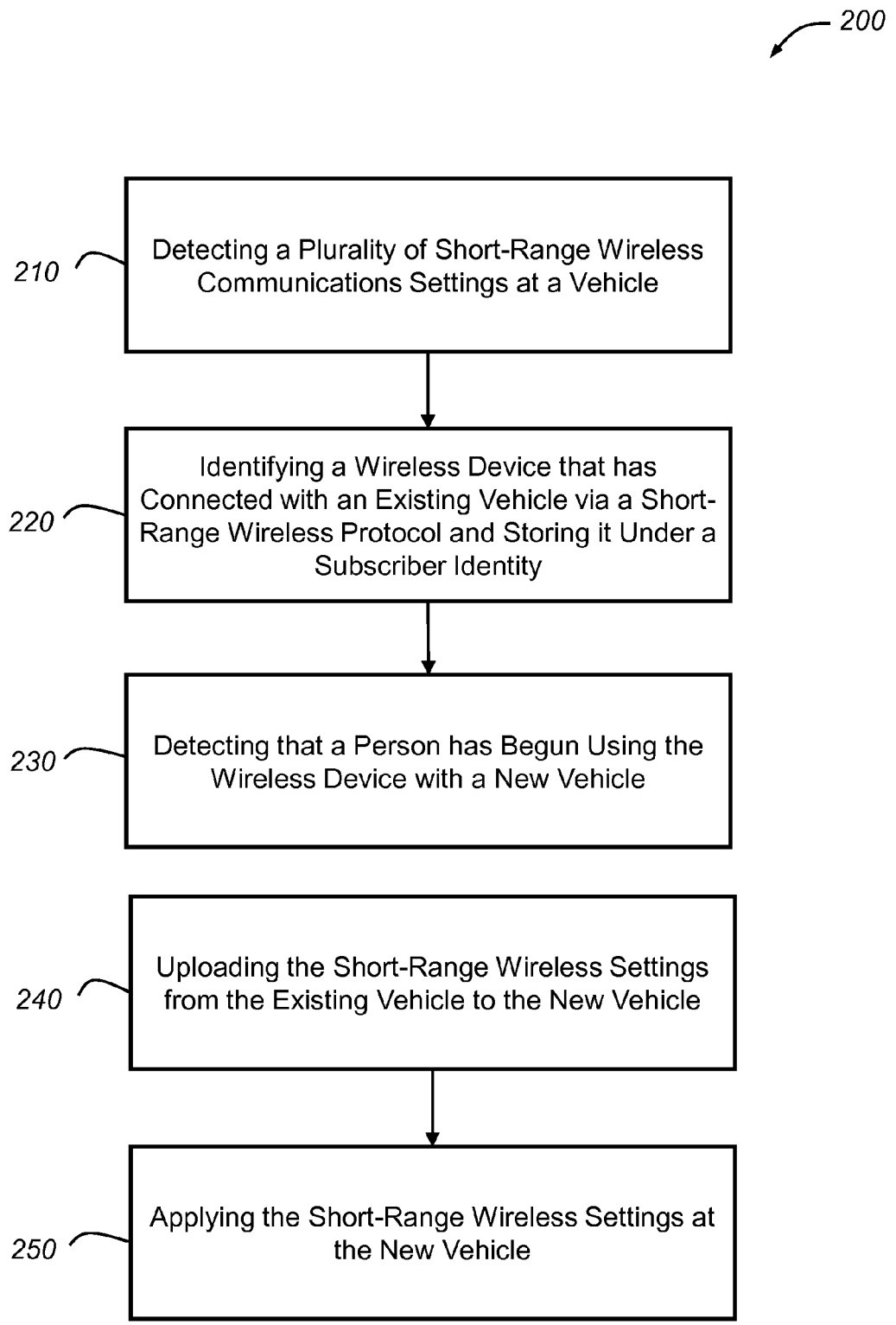
FIG. 2 is a block diagram of a method of managing short-range wireless communications settings in a plurality of vehicles.

Turning now to FIG. 2, there is shown a method 200 of managing short-range wireless communications settings applied at a vehicle. At step 210 a plurality of short-range wireless communications settings used by an existing vehicle are detected and stored with a subscriber identity. The existing vehicle can be a vehicle that a vehicle owner, lessee, or occupant uses with one or more wireless devices. As part of its interaction with the wireless devices, the existing vehicle may use one or more short-range wireless communications settings. These settings can include a wireless identifier broadcast by the existing vehicle as part of establishing a short-range wireless link, the passwords the existing vehicle uses to regulate access to its wireless networks (e.g., Wi-Fi hotspot), and other definable variables used to establish short-range wireless links between a vehicle and a wireless device. For example, a vehicle driver can establish a subscriber identity or account with a central facility or database, such as the computer 18, which can include a variety of information such as a vehicle owner's identity, a vehicle identifier, the identity of one or more wireless devices previously linked with the existing vehicle, a wireless identifier broadcast by the existing vehicle, a password used by the existing vehicle for gaining access to the existing vehicle, or some combination of this data. One example of the wireless identifier broadcast by the existing vehicle is a service set identification (SSID) broadcast at a Wi-Fi hotspot provided by an existing vehicle. A password can be used to secure the Wi-Fi network and can be saved with the SSID under the subscriber identity.

The information stored with the subscriber identity can be stored with the identity of the vehicle owner or user either locally at the existing vehicle or this information can be wirelessly transmitted to a central facility. An example of the existing vehicle is vehicle 12 shown in FIG. 1. Using the vehicle 12, the information can be stored at memory device 54 or can be wirelessly transmitted to a central facility, such as the computer 18, from the vehicle telematics unit 30. When these settings are wirelessly transmitted to the computer 18, they can be stored in a subscriber database under subscriber identities that can be searched to identify particular wireless devices, vehicle users/owners, or vehicle identities. The method 200 proceeds to step 220.

At step 220, a wireless device that has connected with the existing vehicle using a short-range wireless protocol is identified. When the existing vehicle establishes a short-range wireless link with a wireless device, the existing vehicle can detect and store its identity. Storing the identity of the wireless device that has previously established the short-range wireless link can help recognize the device in the future. In one example, the identity of the wireless device is a media access control (MAC) address provided from the wireless device to the vehicle telematics unit 30 over a short-range wireless link. The existing vehicle can then use the vehicle telematics unit 30 to transmit the MAC address to the computer 18 and store it under the subscriber identity. The existing vehicle can also store the MAC address under the subscriber identity locally. The subscriber identity can link the vehicle user to one or more wireless devices via the identifier—in this case, the MAC address. The method 200 proceeds to step 230.

At step 230, a person associated with the subscriber identity is detected as having begun using a new vehicle. Like the existing vehicle, an example of the new vehicle is shown in FIG. 1 as vehicle 12. However, the existing vehicle has previously established short-range wireless links with one or more wireless devices stored under the subscriber identity. The new vehicle may have not been used with wireless devices identified under the subscriber identity. So, when a vehicle owner, lessee, or operator (collectively, "the user") approaches or enters the new vehicle, the subscriber identity associated with the person can be applied at the new vehicle.

In one example, the user can come into short-range wireless communication range of the new vehicle. The new vehicle can detect a wireless device carried by the user, such as by receiving the identity of the wireless device (e.g., MAC address). The new vehicle can first search the memory device 54 located at the new vehicle to determine if the wireless device is recognized. If not, the new vehicle can wirelessly transmit a request to a central database, such as the computer 18, that includes the identity of the wireless device under a subscriber identity. The request can direct computer 18 to search the database containing subscriber identities fir a match with the transmitted wireless identity. When the detected wireless device is found under one of the subscriber identities, the new vehicle can gain access to other short-range wireless settings included with the subscriber identity.

In another example, the user can enter the new vehicle and manually access his or her subscriber identity by entering a user identification and a password. The user can do so using the wireless device or vehicle electronics 28 of the new vehicle. When presented with a visual prompt, such as via display 38 or smart phone display 59, or an audio prompt, such as via audio system 36, the user can access the subscriber identity via the user identification/password that can be entered and sent to the computer 18 for verification. Providing the user identification/password for the subscriber identity can signal that the user has begun using the new vehicle. The method 200 proceeds to step 240.

At step 240, the plurality of short-range wireless communications settings are uploaded to the new vehicle. When the new vehicle determines that the user is present, the new vehicle can convey this fact to the computer 18 and access short-range wireless communications settings. The new vehicle can alert the computer 18 of the presence of the user in response to, for instance, successfully receiving a user identification/password or determining that a detected wireless device of the user is associated with the subscriber identity as described in step 230. The computer 18 can then access short-range wireless communications settings associated with the subscriber account and then wirelessly transmit those settings to the new vehicle. The new vehicle can received the short-range wireless communications settings and store them. For instance, the wireless identifier broadcast by the existing vehicle can be transmitted to the new vehicle as can the password the existing vehicle uses for security. When the existing vehicle broadcasts an SSID as part of its Wi-Fi hotspot service, the SSID can be stored with the subscriber identity at computer 18 and is wirelessly sent from computer 118 to the new vehicle. The method 200 proceeds to step 250.

At step 250, the plurality of short-range wireless communications settings associated with the subscriber identity are applied to the new vehicle. After receiving the data included with the subscriber identity, the new vehicle can then use that data to establish short-range wireless links without manual authentication. For example, the wireless identifier broadcast by the existing vehicle can be broadcast by the new vehicle. And wireless devices that have been used in the existing vehicle can recognize the broadcast wireless identifier and in response provide the password used with the existing vehicle. The new vehicle, having previously obtained the password from the subscriber identity, can accept the password used at the existing vehicle and proceed to establish a short-range wireless communication link with the wireless device. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of managing short-range wireless communications settings applied at a vehicle, comprising the steps of:
   (a) detecting a plurality of short-range wireless communications settings used by an existing vehicle;
   (b) storing the plurality of short-range wireless communications settings with a subscriber identity;
   (c) detecting that a person associated with the subscriber identity has begun using a new vehicle;
   (d) uploading the plurality of short-range wireless communications settings from the existing vehicle to the new vehicle; and
   (e) applying the plurality of short-range wireless communications settings associated with the subscriber identity to the new vehicle.

2. The method of claim 1, wherein the plurality of short-range wireless communications settings further comprise a vehicle owner's identity, a vehicle identifier, an identity of one or more wireless devices previously linked with the existing vehicle, a wireless identifier broadcast by the existing vehicle, or a password used by the existing vehicle.

3. The method of claim 2, wherein the wireless identifier further comprises a service set identifier (SSID) used with a Wi-Fi hotspot provided by the existing vehicle.

4. The method of claim 1, wherein the subscriber identity is stored at a central facility.

5. The method of claim 4, wherein the central facility receives search queries from the new vehicle.

6. The method of claim 1, further comprising the step of uploading the plurality of short-range wireless communications settings from the existing vehicle to the new vehicle in response to determining an identity of a detected wireless device is stored under the subscriber identity.

7. The method of claim 6, wherein the identity of the detected wireless device is a media access control (MAC) address.

8. The method of claim 1, further comprising the step of uploading the plurality of short-range wireless communications settings from the existing vehicle to the central facility.

9. A method of managing short-range wireless communications settings applied at a vehicle, comprising the steps of:
- (a) storing an identity of a wireless device with a subscriber identity;
- (b) linking a wireless identifier broadcast by an existing vehicle with the subscriber identity;
- (c) detecting the presence of the wireless device stored with the subscriber identity at a new vehicle; and
- (d) transmitting the wireless identifier broadcast by the existing vehicle to the new vehicle in response to step (c); and
- (e) broadcasting the wireless identifier at the new vehicle.

10. The method of claim 9, wherein the identity of the wireless device further comprises a media access control (MAC) address.

11. The method of claim 9, wherein the wireless identifier broadcast by the existing vehicle further comprises a service set identifier (SSID) used with a Wi-Fi hotspot provided by the existing vehicle.

12. The method of claim 9, further comprising the step of storing the identity of a wireless device with a subscriber identity at a central facility.

13. The method of claim 12, further comprising the step of transmitting an identity of the wireless device detected at the new vehicle to the central facility and determining if the wireless device detected at the new vehicle is stored under the subscriber identity.

14. A method of managing short-range wireless communications settings applied at a vehicle, comprising the steps of:
- (a) broadcasting a service set identification (SSID) at a Wi-Fi hotspot provided by an existing vehicle;
- (b) identifying at the existing vehicle a wireless device that has used the Wi-Fi hotspot;
- (c) storing the identity of the wireless device that has used the Wi-Fi hotspot and the broadcast SSID under a subscriber identity;
- (d) detecting the identity of the wireless device at a new vehicle;
- (e) searching a central database of subscriber identities for the identity of the detected wireless device;
- (f) when the identity of the wireless device is located in the central database, accessing the SSID stored with the identity of the wireless device under the subscriber identity;
- (g) wirelessly downloading the accessed SSID at the new vehicle; and
- (h) broadcasting the SSID at a Wi-Fi hotspot provided by the new vehicle.

15. The method of claim 14, wherein the identity of the wireless device further comprises a media access control (MAC) address.

16. The method of claim 14, further comprising the step of storing the subscriber identity at a central.

* * * * *